United States Patent
Kim et al.

(10) Patent No.: US 11,822,047 B1
(45) Date of Patent: Nov. 21, 2023

(54) METEOROLOGICAL OBSERVATION DEVICE FOR OBSERVING THE WEATHER IN THE ATMOSPHERIC BOUNDARY LAYER OR PLANETARY BOUNDARY LAYER

(71) Applicant: NATIONAL INSTITUTE OF METEOROLOGICAL SCIENCES, Seogwipo-si (KR)

(72) Inventors: Geon Tae Kim, Gangneung-si (KR); Jin Hwa Lee, Gangneung-si (KR); Mi Eun Park, Gangneung-si (KR); Byung Hwan Lim, Seogwipo-si (KR)

(73) Assignee: NATIONAL INSTITUTE OF METEOROLOGICAL SCIENCES, Seogwipo-si (KR)

( * ) Notice: Subject to any disclaimer, the term of this patent is extended or adjusted under 35 U.S.C. 154(b) by 0 days.

(21) Appl. No.: 18/212,070

(22) Filed: Jun. 20, 2023

(30) Foreign Application Priority Data

Jun. 22, 2022 (KR) ........................ 10-2022-0076482

(51) Int. Cl.
*G01W 1/08* (2006.01)
*G01C 1/02* (2006.01)
(Continued)

(52) U.S. Cl.
CPC .............. *G01W 1/02* (2013.01); *B64U 10/14* (2023.01); *B64U 2101/35* (2023.01)

(58) Field of Classification Search
CPC ........... G01W 1/02; G01W 1/08; G01W 1/06; G01W 1/14; G01W 1/00; G01W 1/10; G01W 2203/00; G01W 2001/006; B64C 39/024; B64D 47/00; G01C 1/02; G01C 17/32; G01C 13/004; G01C 5/005; G01C 21/28; G01S 19/14; G01J 5/007; G01J 2005/0077

(Continued)

(56) References Cited

FOREIGN PATENT DOCUMENTS

| JP | H03235072 A | * | 10/1991 | |
|---|---|---|---|---|
| JP | 3235072 U | | 11/2021 | |
| JP | 2022066062 A | * | 4/2022 | |
| KR | 10-1617667 B1 | | 5/2016 | |
| KR | 101617667 B1 | * | 5/2016 | ............. G01D 21/02 |

(Continued)

OTHER PUBLICATIONS

Korean Office Action dated Aug. 10, 2022 as received in application No. 10-2022-0076482.

(Continued)

*Primary Examiner* — Jeffrey P Aiello
(74) *Attorney, Agent, or Firm* — Maschoff Brennan

(57) ABSTRACT

There is disclosed a meteorological observation device for observing weather in an Atmospheric Boundary Layer or a Planetary Boundary Layer, comprising: a basic observation unit and one or more additional observation units which are connected directly or indirectly to the basic observation unit; a storage box whose inner space is compartmentalized to form a plurality of grids, wherein the grids include 1-st type cells, each of which holds the basic observation unit and each of the one or more additional observation units and 2-nd type cells, each of which forms 1-st sub space for holding a basic wire and 2-nd sub space for holding each of additional wires, wherein a size of each of the 2-nd type cells is determined as a size of each of the 1-st type cells.

10 Claims, 4 Drawing Sheets

(51) Int. Cl.
  *G01C 17/32* (2006.01)
  *G01C 5/00* (2006.01)
  *B64D 47/00* (2006.01)
  *G01S 19/14* (2010.01)
  *G01W 1/02* (2006.01)
  *B64U 10/14* (2023.01)
  *B64U 101/35* (2023.01)

(58) Field of Classification Search
  USPC .......... 73/170.16; 324/434; 340/539.28, 601,
    340/539.13, 539.26, 602, 995.1, 539.1;
    342/357.23, 26 A, 26 R, 26 B; 701/423,
    701/65, 415; 702/3, 2, 1, 150, 5, 130,
    702/179, 189, 99
  See application file for complete search history.

(56) References Cited

FOREIGN PATENT DOCUMENTS

| KR | 10-1861178 | B1 | | 5/2018 | |
| KR | 101861178 | B1 | * | 5/2018 | .............. G01W 1/08 |
| KR | 10-2018-0119729 | A | | 11/2018 | |
| KR | 2018119729 | A | * | 11/2018 | ........... B64C 39/024 |
| KR | 10-2022-0050627 | A | | 4/2022 | |
| KR | 2022050627 | A | * | 4/2022 | |
| RU | 2002130462 | A | * | 5/2004 | |

OTHER PUBLICATIONS

Decision to Grant Patent dated Nov. 21, 2022 as received in application No. 10-2022-0076482.

* cited by examiner

METEOROLOGICAL OBSERVATION DEVICE FOR OBSERVING THE WEATHER IN THE ATMOSPHERIC BOUNDARY LAYER OR PLANETARY BOUNDARY LAYER

CROSS REFERENCE TO RELATED APPLICATION

This application claims the benefit of earlier filing date of Korean patent application No. 10-2022-0076482 filed on Jun. 22, 2022, the entire contents of which being incorporated herein by reference.

FIELD OF THE DISCLOSURE

The present disclosure relates to a meteorological observation device for observing the weather in the atmospheric boundary layer or the planetary boundary layer.

BACKGROUND OF THE DISCLOSURE

There are some methods for observing the weather in the ABL (Atmospheric Boundary Layer) or PBL (Planetary Boundary Layer).

However, those methods have many drawbacks as follows.

For example, an aircraft for weather observation is characterized in that it mainly observes high altitude, difficult to observe low altitude for a long time, and is very expensive. Further, a weather satellite requires fine day for weather observation, as it cannot take a high-resolution image. Furthermore, radar is used to observe the atmosphere from the ground, but the radar needs to observe it from the ground with high altitude or vast plains, and it cannot measure the characteristics of the atmosphere such as aerosols, but merely measures water particles. Moreover, a radiosonde is mainly used to observe the atmosphere with high-altitude and also used for observation in ABL, but the radiosonde is expensive and disposable, which causes environmental pollution. Further, only 5 minutes of data acquired from the radiosonde can be used despite the long flight time. Furthermore, a remote sensing equipment requires advanced technology for installation and operation, resulting in high maintenance costs and difficult installation.

Therefore, a solution is needed to overcome the problems of the said devices.

SUMMARY OF THE DISCLOSURE

It is an object of the present disclosure to solve all the aforementioned problems.

It is another object of the present disclosure to provide meteorological observation data at different altitudes by efficiently connecting a plurality of weather observation units to a drone.

It is still another object of the present disclosure to acquire each of the meteorological observation data for each 3D location information of each of the weather observation units.

It is still yet another object of the present disclosure to hold the weather observation units in a storage box capable of effectively allowing the observation units to be deployed.

In order to accomplish the objects above, distinctive structures of the present disclosure are described as follows.

In accordance with one aspect of the present disclosure, there is provided a meteorological observation device for observing weather in an Atmospheric Boundary Layer or a Planetary Boundary Layer, comprising: a basic observation unit which is connected to a drone at an upper part thereof; and one or more additional observation units which are connected directly or indirectly to a lower part of the basic observation unit, wherein, in case the one or more additional observation units only include a specific additional observation unit, the specific additional observation unit is connected to the lower part of the basic observation unit, wherein, in case the one or more additional observation units include the specific additional observation unit and one or more other additional observation units, an upper part of the specific additional observation unit is connected to the lower part of the basic observation unit and said other additional observation units are connected directly or indirectly to a lower part of the specific additional observation unit one after another, wherein the meteorological observation device further comprises: a storage box whose inner space is compartmentalized to form a plurality of grids, and wherein the grids include (i) 1-st type cells, each of which forms main space for holding the basic observation unit and each of the one or more additional observation units while the basic observation unit and each of the one or more additional observation units are connected one after another through wires and (ii) 2-nd type cells, each of which forms (ii-1) 1-st sub space for holding a basic wire capable of connecting the basic observation unit and the specific additional observation unit in case the one or more additional observation units only include the specific additional observation unit while the basic observation unit and the specific additional observation unit are connected through the basic wire and (ii-2) 2-nd sub space for holding each of additional wires capable of connecting each of said other additional observation units one after another, in case the one or more additional observation units include the specific additional observation unit and said other additional observation units while the basic observation unit, the specific additional observation unit and said other additional observation units are connected one after another through the basic wire and the additional wires, wherein a size of each of the 2-nd type cells is determined as a size of each of the 1-st type cells.

As one example, the basic observation unit and the additional observation units respectively include: a housing through which cavity is formed such that the cavity is configured to penetrate the housing through one or more certain sites; an anemometer installed in the cavity; a battery installed in (1_1)-st space within the housing; a data logger installed in (1_2)-nd space within the housing; and at least one sensor installed in 2-nd space within the housing; wherein one side of the 2-nd space is connected to the cavity through a 1-st opening, and an opposite side of the 2-nd space is connected to outside of the housing through a 2-nd opening.

As one example, the basic observation unit and the additional observation units respectively further include: a wing part having at least one of a bottom wing attached to a bottom surface of the housing and a side wing attached to at least one area on a side surface of the housing, wherein the bottom wing and the side wing respectively have surfaces whose normal vectors are perpendicular to a longitudinal direction of the cavity; bearings which are respectively installed at a top surface and the bottom surface of the housing to support rotation of the housing; and connecting rings which are respectively attached to the top surface and the bottom surface of the housing via the respective bearings, wherein the connecting ring of the basic observation unit and the connecting ring of the additional observation units are respectively connected to their adjacent connecting rings of their adjacent observation units through the basic wire and the additional wires.

As one example, while external air is introduced into the 2-nd space in order of introducing the external air into the cavity, forwarding the external air in the cavity into the 2-nd space through the 1-st opening, and then discharging the external air in the 2-nd space through the 2-nd opening, when each of meteorological observation data is acquired from the sensor of the basic observation unit and the sensor of each of the additional observation units for a predetermined time, the data logger is configured to receive each of the meteorological observation data, and then transmit each of the meteorological observation data to a computing device in a certain condition.

As one example, each of the basic observation unit and the additional observation units respectively further includes: each GPS module for measuring each location information of each of the basic observation unit and the additional observation units; and each electronic compass module for measuring each direction information of each of the basic observation unit and the additional observation units, wherein, in response to acquiring (i) the each location information and the each direction information of each of the basic observation unit and the additional observation units respectively from the each GPS module and the each electronic compass module included in each of the basic observation unit and the additional observation units and (ii) each of the meteorological observation data from the sensor of the basic observation unit and the sensor of each of the additional observation units for the predetermined time, the data logger is configured to receive each of the meteorological observation data to be matched with the each location information and the each direction information of each of the basic observation unit and the additional observation units, and then transmit each of the meteorological observation data to the computing device in the certain condition.

As one example, the each location information includes each latitude information, each longitude information and each altitude information of each of the basic observation unit and the additional observation units.

As one example, the 1-st type cells include a basic observation unit cell for holding the basic observation unit and additional observation unit cells for holding the additional observation units, wherein the 2-nd type cells include a basic wire cell for holding the basic wire and additional wire cells for holding the additional wires.

As one example, the grids of the storage box include: a plurality of cells in A rows and B columns, wherein the 1-st type cells and the 2-nd type cells are arranged in the B columns in a predetermined order, wherein each type of each of the cells included in each of the A rows is determined by its corresponding type of its corresponding column among the B columns, and wherein, while the basic observation unit and the additional observation units are connected through the wire, each of the basic observation unit and the additional observation units is inserted into each of the cells in order of from a 1-st column to a B-th column of a 1-st row among the A rows, from a B-th column to a 1-st column of a 2-nd row among the A rows, . . . , columns of an A-th row among the A rows, until all the additional observation units are inserted.

As one example, the girds of the storage box include: the plurality of cells in the A rows and B columns, wherein, as a criterion for determining arrangement of the 1-st type cells and the 2-nd type cells in the B columns, in case a distance between a 1-st specific observation unit and a 2-nd specific observation unit selected among the basic observation unit and the additional observation units is planned to be greater than a predetermined threshold, two or more cells whose locations in the storage box correspond to a specific wire for connecting the 1-st specific observation unit and the 2-nd specific observation unit are set as the 2-nd type cells.

As one example, the basic observation unit and the additional observation units are deployed in different altitudes respectively when the drone is driven, and the basic observation unit is deployed at a higher altitude than the additional observation units.

BRIEF DESCRIPTION OF THE DRAWINGS

The accompanying drawings used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
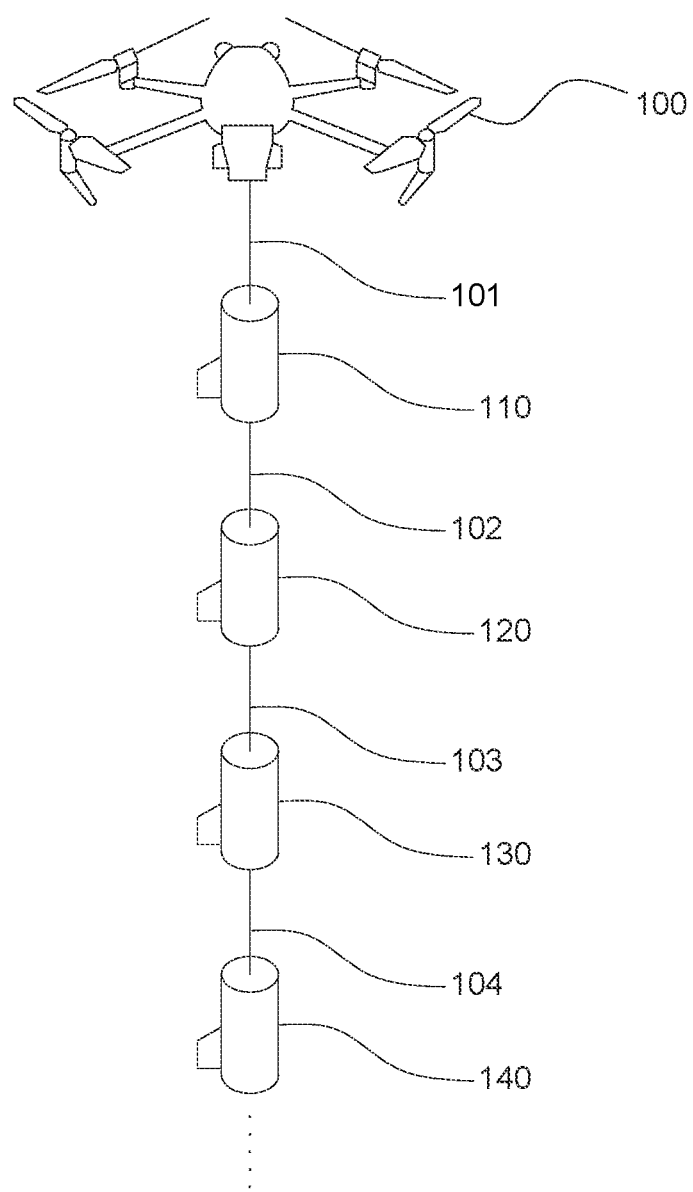
FIG. 1 is a drawing schematically representing a configuration of a meteorological observation device for observing weather at a plurality of altitudes in ABL or PBL in accordance with one example embodiment of the present invention.

In the following detailed description, reference is made to the accompanying drawings that show, by way of illustration, specific embodiments in which the invention may be practiced. These embodiments are described in sufficient detail to enable those skilled in the art to practice the invention.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Furthermore, the present invention includes all possible combinations of embodiments indicated in the present disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

To allow those skilled in the art to the present disclosure to be carried out easily, the example embodiments of the present disclosure by referring to attached diagrams will be explained in detail as shown below.

FIG. 1 is a drawing schematically representing a configuration of a meteorological observation device for observing weather at a plurality of altitudes in an ABL or a PBL in accordance with one example embodiment of the present invention.

Referring to FIG. 1, in order to observe the weather at the plurality of altitudes, a basic observation unit 110 may be connected to a lower part of a drone 100 through a basic wire 101, one or more additional observation units 120, 130, 140, etc., may be connected to a lower part of the basic observation unit 110 through one or more additional wires 102, 103, 104, etc.

As one example, in case there is only one additional observation unit, e.g., a specific additional observation unit 120, the basic observation unit 110 is connected to the drone 100 through the basic wire 101, and then the specific additional observation unit 120 can be connected to the lower part of the basic observation unit 110.

As another example, in case there are multiple additional observation units, e.g., three additional observation units, the basic observation unit 110 is connected to the drone 100 through the basic wire 101. And then the first additional observation unit 120, the specific additional observation unit 120, can be connected to the lower part of the basic observation unit 110 through the 1-st additional wire 102, the 2-nd additional observation unit 130 can be connected to the lower part of the 1-st additional observation unit 120 through the 2-nd additional wire 103, and the 3-rd additional observation unit 140 can be connected to the lower part of the 2-nd additional observation unit 130 through the 3-rd additional wire 104.

Herein, one wire with a predetermined length can be used to connect one unit and one of its adjacent units, but two or more wires can be connected with each other to secure an extended length in order to measure the weather at a plurality of altitudes with an extended distance between said one unit and said one of its adjacent units.

Further, a lower part of the last additional observation unit, i.e., the additional observation unit connected to the bottommost, may not have a connection with a wire.

To allow those skilled in the art to implement the present disclosure without difficulty, a detailed structure of the present disclosure will be explained in detail by referring to FIG. 2A and FIG. 2B.

Figure 2A:
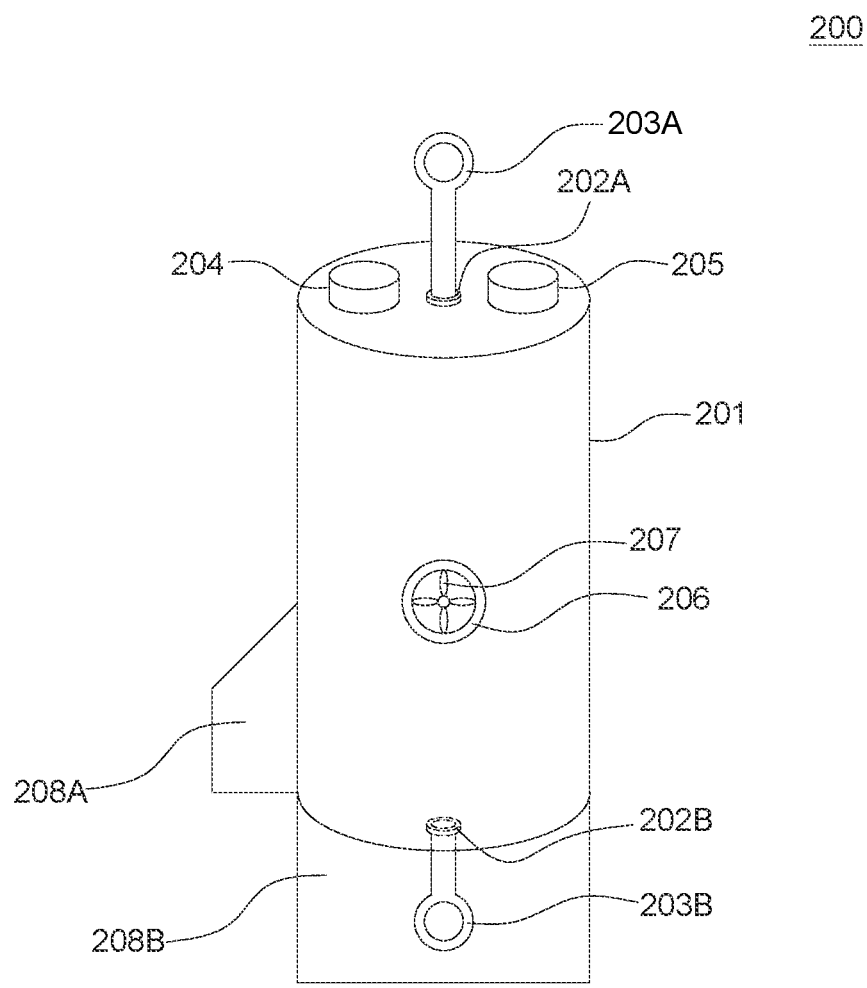
FIG. 2A and FIG. 2B are drawings schematically representing an exterior and an interior of an observation unit for observing the weather in the ABL or the PBL in accordance with one example embodiment of the present invention.
Figure 2B:
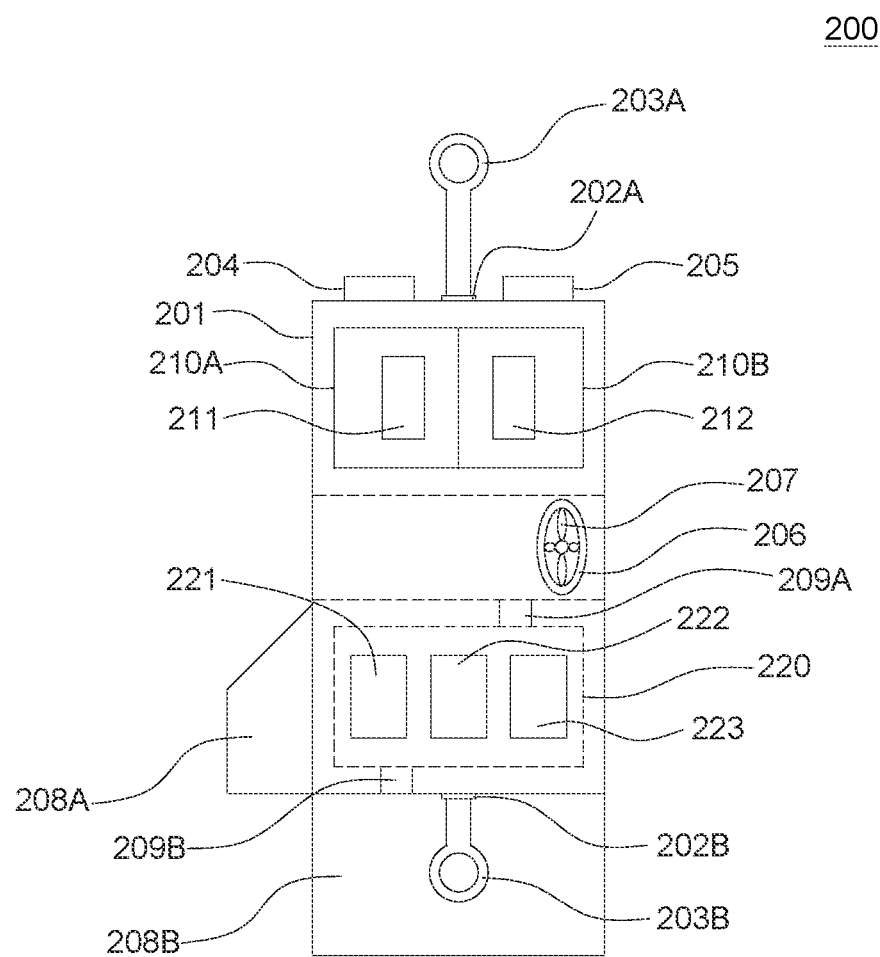

In FIG. 2A and FIG. 2B, the basic observation unit 110 and the additional observation units 120, 130, 140, etc. are going to be called as "unit 200" or "observation unit 200" for short.

FIG. 2A and FIG. 2B are drawings schematically representing an exterior and an interior of an observation unit 200 for observing the weather in the ABL or the PBL in accordance with one example embodiment of the present invention.

Referring to FIG. 2A, in accordance with one example embodiment of the present invention, the unit 200 can include a housing 201 through which cavity is formed such that the cavity is configured to penetrate the housing 201 through at least one certain site, e.g., a vent 206, and an anemometer 207 installed in the cavity.

Herein, the cavity inside the housing 201 introduces wind through the vent 206 to prevent disturbances such as frost or direct sunlight caused by prolonged flight in the air.

Further, a GPS module 204 that can measure a location of the unit 200 and an electronic compass module 205 that can measure a direction of the unit 200 can be installed on the housing 201.

Herein the GPS module 204 and/or the electronic compass module 205 may not necessarily be installed in an upper part of the unit 200.

FIG. 2B is provided for a more detailed description.

Referring to FIG. 2B, a battery 211 may be installed in (1_1)-st space 210A within the housing 201, a data logger 212 may be installed in (1_2)-nd space 210B within the housing 201 and at least one sensor 221, 222, 223 may be installed in 2-nd space 220 within the housing 201.

Further, one side, e.g., an upper side, of the 2-nd space 220 may be connected to the cavity through a 1-st opening 209A that allows an external air to be introduced through the vent 206, and an opposite side, e.g., a lower side, of the 2-nd space 220 may discharge it, i.e., the external air introduced into the 2-nd space, through a 2-nd opening 209B to the outside of the housing 201.

In addition, each of the sensors 221, 222, 223 installed in the 2-nd space 220 may be a temperature sensor 221 that measures a temperature of the air introduced into the 2-nd space through the 1-st opening 209A, a barometric pressure sensor 222 that measures a barometric pressure of the air, and/or a humidity sensor 223 that measures a humidity of the air.

Herein, whenever each of meteorological observation data is acquired by the temperature sensor 221, the barometric pressure sensor 222, and the humidity sensor 223 in the 2-nd space 220 for a predetermined time, each of the meteorological observation data, its corresponding location information measured by the GPS module 204 and its corresponding direction information measured by the electronic compass module 205 may be transmitted to the data logger 212. And then, the data logger 212 may transmit each of the meteorological observation data, its corresponding location information, and its corresponding direction information to an external computing device under a certain condition.

For example, if the location information, e.g., latitude, longitude, altitude, measured by the GPS module 204 and/or the electronic compass module 205 at a certain time is 39.6S, 130.5W, 800 m, the meteorological observation data, e.g., temperature of 15° C., humidity of 50.0% RH, and barometric pressure of 500 hPa measured at the certain time are mapped to the location information, i.e., 39.6S, 130.5W, 800 m, and stored in the data logger 212.

In a similar way, each of the basic observation unit 110 and the additional observation units 120, 130, 140, etc. respectively includes: each GPS module 204 for measuring each location information of each of the basic observation unit 110 and the additional observation units 120, 130, 140, etc. and each electronic compass module 205 for measuring each direction information of each of the basic observation unit 110 and the additional observation units 120, 130, 140, etc.

Herein, in response to acquiring (i) the each location information and the each direction information of each of the basic observation unit 110 and the additional observation units 120, 130, 140, etc. respectively from the each GPS module 204 and the each electronic compass module 205 included in each of the basic observation unit 110 and the additional observation units 120, 130, 140, etc. and (ii) each of the meteorological observation data from the sensor of the basic observation unit 110 and the sensor of each of the additional observation units 120, 130, 140, etc. for the predetermined time, the data logger 212 is configured to receive each of the meteorological observation data to be matched with the each location information and the each direction information of each of the basic observation unit 110 and the additional observation units 120, 130, 140, etc., and then transmit each of the meteorological observation data to the computing device in the certain condition.

Meanwhile, by referring FIG. 2A and FIG. 2B, a bearing 200A and a bearing 200B may be respectively installed on the upper part and the lower part of the housing 201 to facilitate rotations of the units 200, and a connecting ring 203A and a connecting ring 203B may be respectively installed on the upper part and the lower part of the housing 201 respectively through the bearing 200A and the bearing 200B. The connecting ring 203A and the connecting ring 203B may be used to connect one unit with its one or more adjacent units via the basic wire and/or the additional wire.

Furthermore, a bottom wing 208B may be attached to a bottom surface of the housing 201 and a side wing 208A may be attached to at least one area on a side surface of the housing 201. Herein, the bottom wing 208B and the side wing 208A respectively have surfaces whose normal vectors are perpendicular to a longitudinal direction of the cavity. The bottom wing 208B and the side wing 208A are used to measure wind direction more accurately and to facilitate horizontal rotation of the housing 201.

Figure 3:
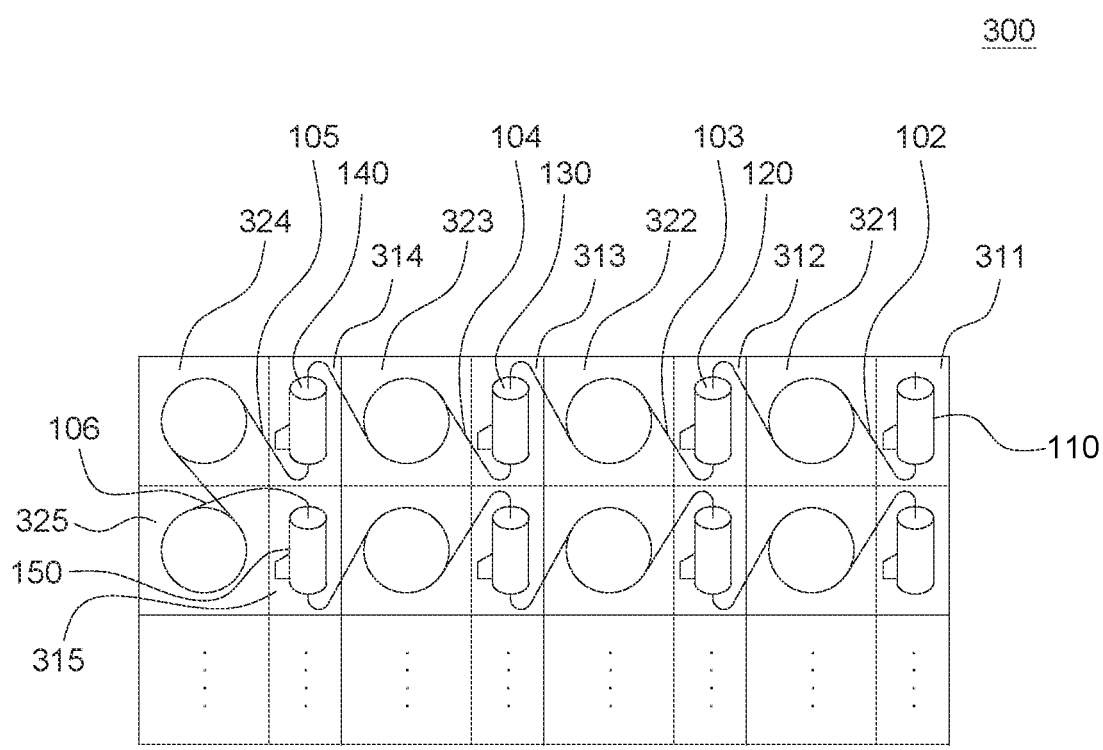
FIG. 3 is a drawing representing a schematic state of holding a plurality of observation units and wires for connecting each adjacent two observation units thereamong in a storage box in accordance with one example embodiment of the present invention.

FIG. 3 is a drawing representing a schematic configuration of the observation units and the wires stored in a storage box in accordance with one example embodiment of the present invention.

The reference numbers in FIG. 1 will also be applied to FIG. 3 for better understanding.

By referring to FIG. 3, the storage box 300 may form a plurality of grids that hold the basic observation unit 110, the basic wire 101, the additional observation units 120, 130, 140, 150, etc., and the additional wires 102, 103, 104, 105, 106, etc.

Herein, the basic observation unit 110 and the additional observation units 120, 130, 140, 150, etc. may be held in 1-st type cells 311, 312, 313, 314, 315, etc., (where the 1-st type cells can be a basic observation unit cell 311 and additional observation unit cells 312, 313, 314, 315, etc.) and the basic wire 101 and the additional wires 102, 103, 104, 105, 106, etc. may be held in 2-nd type cells 321, 322, 323, 324, 325, etc. (where the 2-nd type cells can be a basic wire cell, not shown, and additional wire cell 321, 322, 323, 324, 325, etc.). Although FIG. 3 does not show the state of the basic wire 101 being held in the basic wire cell, it is possible that, in some cases, the basic wire 101 can also be held in the basic wire cell. Herein, one of the 1-st type cells 311, 312, 313, 314, 315, etc. and the 2-nd type cells 321, 322, 323, 324, 325, etc. can be selected as the basic wire cell.

The advantage of holding each part of the device (i.e., each of the observation units and each of the wires) in the storage box 300 is that as the drone 100 starts to operate, each part held in the storage box 300 can be lifted up to the air while maintaining the connections between one unit and its one or more adjacent units as shown in FIG. 1.

Meanwhile, a size of the 2-nd type cells may be larger than a size of the 1-st type cells, but it is not limited thereto in case each of wires has a short length.

Also, the grids of the storage box 300 may include a plurality of cells in A rows and B columns, and the 1-st type cells 311, 312, 313, 314, 315, etc. and the 2-nd type cells 321, 322, 323, 324, 325, etc. are arranged in the B columns in a predetermined order, where each type of each of the cells included in each of the A rows being determined by its corresponding type of its corresponding column among the B columns, and while the basic observation unit 110 and the additional observation units 120, 130, 140, 150, etc. are connected through the wires, each of the basic observation unit 110 and the additional observation units 120, 130, 140, 150, etc. can be inserted into each of the cells in the order of from a 1-st column to a B-th column of a 1-st row among the A rows, from a B-th column to a 1-st column of a 2-nd row among the A rows, ..., columns of an A-th row among the A rows, until all the additional observation units 120, 130, 140, 150, etc. are inserted to the cells.

Specifically, assuming that the basic observation unit 110 and the 1-st additional observation unit 120 to the 4-th additional observation unit 150 are directly or indirectly connected to the drone 100 where the basic wire 101 may or may not be connected to the drone 100 in advance. The basic observation unit 110 may be held in the basic observation unit cell 311; the 1-st additional wire 102 may be held in the 1-st additional wire cell 321; the 1-st additional observation unit 120 which is an adjacent unit to the basic observation unit 110 may be held in the 1-st additional observation unit cell 312; the 2-nd additional wire 103 which is connected to a lower part of the 1-st additional observation unit 120 may be held in the 2-nd additional wire cell 322; the 2-nd additional observation unit 130 may be held in the 2-nd additional observation unit cell 313; the 3-rd additional wire 104 which is connected to a lower part of the 2-nd additional observation unit 130 may be held in the 3-rd additional wire cell 323; the 3-rd additional observation unit 140 may be held in the 3-rd additional observation unit cell 314; and the 4-th additional wire 105 which is connected to a lower part of the 3-rd additional observation unit 140 may be held in the 4-th additional wire cell 324, and the like.

Further, B columns in the grids of the storage box 300 have a certain criterion for determining arrangement of the 1-st type cells 311, 312, 313, 314, 315, etc. and the 2-nd type cells 321, 322, 323, 324, 325, etc., and in case a distance between at least one specific observation unit and its one adjacent observation unit, selected among the basic observation unit 110 and the additional observation units 120, 130, 140, 150, etc. is planned to be greater than a predetermined threshold, two or more consecutive cells whose locations in the storage box 300 correspond to a specific wire for connecting said one specific observation unit and its said one adjacent observation unit are set as the 2-nd type cells.

For instance, in FIG. 3, a cell 324 corresponding to B-th column of the 1-st row and a cell 325 corresponding to B-th column of the 2-nd row are arranged with the type of the cell 324 and the type of the cell 325 being determined as the 2-nd type cells in a series to store a long wire. Of course, if the wire is not that long, it is possible to have the cell 324 hold the wire and cell 325 be empty, and then immediately have a cell 315 hold a next observation unit.

The present disclosure has an effect of providing meteorological observation data at different altitudes by efficiently connecting a plurality of the observation units to the drone.

The present disclosure has another effect of acquiring each of the meteorological observation data for each 3D location information of each of the observation units.

The present disclosure has still another effect of holding the observation units in the storage box capable of efficiently allowing the observation units to be deployed.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A meteorological observation device for observing weather in an Atmospheric Boundary Layer or a Planetary Boundary Layer, comprising:
    a basic observation unit which is connected to a drone at an upper part thereof; and
    one or more additional observation units which are connected directly or indirectly to a lower part of the basic observation unit,
    wherein, in case the one or more additional observation units only include a specific additional observation unit, the specific additional observation unit is connected to the lower part of the basic observation unit,
    wherein, in case the one or more additional observation units include the specific additional observation unit and one or more other additional observation units, an upper part of the specific additional observation unit is connected to the lower part of the basic observation unit and said other additional observation units are connected directly or indirectly to a lower part of the specific additional observation unit one after another,
    wherein the meteorological observation device further comprises: a storage box whose inner space is compartmentalized to form a plurality of grids, and wherein the grids include (i) 1-st type cells, each of which forms main space for holding the basic observation unit and each of the one or more additional observation units while the basic observation unit and each of the one or more additional observation units are connected one after another through wires and (ii) 2-nd type cells, each of which forms (ii-1) 1-st sub space for holding a basic wire capable of connecting the basic observation unit and the specific additional observation unit in case the one or more additional observation units only include the specific additional observation unit while the basic observation unit and the specific additional observation unit are connected through the basic wire and (ii-2) 2-nd sub space for holding each of additional wires capable of connecting each of said other additional observation units one after another, in case the one or more additional observation units include the specific additional observation unit and said other additional observation units while the basic observation unit, the specific additional observation unit and said other additional observation units are connected one after another through the basic wire and the additional wires,
    wherein a size of each of the 2-nd type cells is determined as a size of each of the 1-st type cells.

2. The meteorological observation device of claim 1, wherein the basic observation unit and the additional observation units respectively include:
    a housing through which cavity is formed such that the cavity is configured to penetrate the housing through one or more certain sites;
    an anemometer installed in the cavity;
    a battery installed in (1_1)-st space within the housing;
    a data logger installed in (1_2)-nd space within the housing; and
    at least one sensor installed in 2-nd space within the housing;
    wherein one side of the 2-nd space is connected to the cavity through a 1-st opening, and an opposite side of the 2-nd space is connected to outside of the housing through a 2-nd opening.

3. The meteorological observation device of claim 2, wherein the basic observation unit and the additional observation units respectively further include:
    a wing part having at least one of a bottom wing attached to a bottom surface of the housing and a side wing attached to at least one area on a side surface of the housing, wherein the bottom wing and the side wing respectively have surfaces whose normal vectors are perpendicular to a longitudinal direction of the cavity;
    bearings which are respectively installed at a top surface and the bottom surface of the housing to support rotation of the housing; and
    connecting rings which are respectively attached to the top surface and the bottom surface of the housing via the respective bearings,
    wherein the connecting ring of the basic observation unit and the connecting ring of the additional observation units are respectively connected to their adjacent connecting rings of their adjacent observation units through the basic wire and the additional wires.

4. The meteorological observation device of claim 2, wherein, while external air is introduced into the 2-nd space in order of introducing the external air into the cavity, forwarding the external air in the cavity into the 2-nd space through the 1-st opening, and then discharging the external air in the 2-nd space through the 2-nd opening, when each of meteorological observation data is acquired from the sensor of the basic observation unit and the sensor of each of the additional observation units for a predetermined time, the data logger is configured to receive each of the meteorological observation data, and then transmit each of the meteorological observation data to a computing device in a certain condition.

5. The meteorological observation device of claim 2, wherein each of the basic observation unit and the additional observation units respectively further includes:
    each GPS module for measuring each location information of each of the basic observation unit and the additional observation units; and
    each electronic compass module for measuring each direction information of each of the basic observation unit and the additional observation units,
    wherein, in response to acquiring (i) the each location information and the each direction information of each of the basic observation unit and the additional observation units respectively from the each GPS module and the each electronic compass module included in each of the basic observation unit and the additional observation units and (ii) each of the meteorological observation data from the sensor of the basic observation unit and the sensor of each of the additional observation units for the predetermined time, the data logger is configured to receive each of the meteorological observation data to be matched with the each location information and the each direction information of each of the basic observation unit and the additional observation units, and then transmit each of the meteorological observation data to the computing device in the certain condition.

6. The meteorological observation device of claim 5, wherein the each location information includes each latitude information, each longitude information and each altitude information of each of the basic observation unit and the additional observation units.

7. The meteorological observation device of claim 1, wherein the 1-st type cells include a basic observation unit cell for holding the basic observation unit and additional observation unit cells for holding the additional observation units, wherein the 2-nd type cells include a basic wire cell for holding the basic wire and additional wire cells for holding the additional wires.

8. The meteorological observation device of claim 7, wherein the grids of the storage box include:

a plurality of cells in A rows and B columns, wherein the 1-st type cells and the 2-nd type cells are arranged in the B columns in a predetermined order, wherein each type of each of the cells included in each of the A rows is determined by its corresponding type of its corresponding column among the B columns, and wherein, while the basic observation unit and the additional observation units are connected through the wire, each of the basic observation unit and the additional observation units is inserted into each of the cells in order of from a 1-st column to a B-th column of a 1-st row among the A rows, from a B-th column to a 1-st column of a 2-nd row among the A rows, . . . , columns of an A-th row among the A rows, until all the additional observation units are inserted.

9. The meteorological observation device of claim 8, wherein the girds of the storage box include:

the plurality of cells in the A rows and B columns, wherein, as a criterion for determining arrangement of the 1-st type cells and the 2-nd type cells in the B columns, in case a distance between a 1-st specific observation unit and a 2-nd specific observation unit selected among the basic observation unit and the additional observation units is planned to be greater than a predetermined threshold, two or more cells whose locations in the storage box correspond to a specific wire for connecting the 1-st specific observation unit and the 2-nd specific observation unit are set as the 2-nd type cells.

10. The meteorological observation device of claim 1, wherein the basic observation unit and the additional observation units are deployed in different altitudes respectively when the drone is driven, and the basic observation unit is deployed at a higher altitude than the additional observation units.

* * * * *